(12) United States Patent
Clark

(10) Patent No.: US 7,278,336 B2
(45) Date of Patent: Oct. 9, 2007

(54) ADJUSTABLE SHIFT LEVER ASSEMBLY

(76) Inventor: John A. Clark, P.O. Box 620450, Woodside, CA (US) 94062-8605

( * ) Notice: Subject to any disclaimer, the term of this patent is extended or adjusted under 35 U.S.C. 154(b) by 573 days.

(21) Appl. No.: 10/803,107

(22) Filed: Mar. 17, 2004

(65) Prior Publication Data

US 2005/0204856 A1   Sep. 22, 2005

(51) Int. Cl.
*G05G 1/14* (2006.01)
(52) U.S. Cl. ........................................ 74/512
(58) Field of Classification Search .............. 74/551.9, 74/560, 491, 512, 519, 562, 562.5, 516; 280/528, 280/522, 771
See application file for complete search history.

(56) References Cited

U.S. PATENT DOCUMENTS

| | | | | |
|---|---|---|---|---|
| 2,540,926 A | * | 2/1951 | Zook | 192/3.51 |
| 3,667,315 A | * | 6/1972 | Polly, Sr. | 74/551.8 |
| 4,061,051 A | * | 12/1977 | Grandis | 74/473.16 |
| 5,661,999 A | * | 9/1997 | Carone | 74/473.16 |
| 5,779,254 A | * | 7/1998 | James et al. | 280/291 |
| 6,394,214 B1 | * | 5/2002 | Hahm | 180/230 |
| 6,615,687 B2 | * | 9/2003 | Bendetti et al. | 74/551.9 |
| 6,663,129 B1 | * | 12/2003 | Smith | 280/291 |
| 7,114,739 B2 | * | 10/2006 | Colano | 280/291 |

* cited by examiner

*Primary Examiner*—Vicky A. Johnson
(74) *Attorney, Agent, or Firm*—Jill L. Robinson

(57) ABSTRACT

An adjustable gearshift pedal lever for motorcycles and the like designed for attachment to a shift arm. The lever may be designed in a variety of offset lengths that allow for an increase or decrease between the lever and the motorcycle footpeg. In addition, the lever may be raised or lowered vertically by the use of shims selectively placed between the shift arm and the gearshift pedal lever.

15 Claims, 6 Drawing Sheets

ADJUSTABLE SHIFT LEVER ASSEMBLY

BACKGROUND

1. Technical Field

The invention relates to gearshift pedal assemblies for motorcycles.

2. Description of Prior Art

A standard motorcycle gearshift pedal assembly is typically a four-part lever device, made up of the gearshift pedal arm, the gearshift pedal lever, the gearshift pedal lever connecting rivet and the gearshift pedal lever spring. The device is mounted in a stock position and is used for manually shifting gears by using the foot to lift or lower the position of the lever to the point that the multiple desired drive gears or the neutral position is engaged. Once such engagement is accomplished, the lever is released and automatically returns to its position prior to the 'shift' until the next change of gears is desired. This shifting of gears is performed regularly in the process of riding a motorcycle.

The gearshift pedal arm is typically about six inches long and curved to fit the specific application, although the length and the shape of the arm varies between manufacturers and models. The gearshift pedal arm attaches to the engine by connection to the gearshift spindle. The gearshift spindle is a rod with a splined end for attachment to the gearshift pedal arm. The gearshift spindle is part of the mechanical gearing linkage and is connected to the engine. There are usually splined grooves inside the mounting end, and these grooves must be lined up with matching grooves on the gearshift spindle when the connection is made for 'stock' installation position, by sliding the mounting end of the gearshift pedal arm onto the gearshift spindle.

The gearshift pedal arm is designed to be lifted up and pushed down manually, thereby rotating the gearshift spindle and causing the drive gears to shift up or down and into the neutral position. The gearshift pedal lever is the contact point for manual shifting with the foot. It typically has a tubular shaped and knurled horizontal knob that protrudes horizontally and outward, typically at 90 degrees, from a connection point at the end of the gearshift pedal arm.

The gearshift pedal lever is connected to the gearshift pedal arm by the gearshift pedal lever rivet. The gearshift pedal lever rivet is usually a fixed rivet, which connects the gearshift pedal lever to the gearshift pedal arm and holds the gearshift pedal lever spring. This riveted connection does not compress the connection point between the gearshift pedal lever and the gearshift pedal arm. Rather, the rivet acts as a hinge point for the horizontally protruding gearshift pedal lever, allowing it to rotate backward or counterclockwise, typically on the order of 40-45 degrees, in the event of accidental impact, thus reducing the likelihood of breakage of the gearshift pedal assembly or bending of the gearshift pedal arm. The gearshift pedal lever is biased to return to its original position by the gearshift pedal lever spring that is positioned around the gearshift pedal lever rivet.

Shifting gears is performed frequently, while both standing and sitting, and ideally the rider should be able to reach the shift lever comfortably reached with his foot from the proper balance position stance on the footpeg. The correct balance position stance is specific for each rider; however there is a generally accepted position for most riding conditions which presumes that each foot is positioned on the footpeg in approximately the same position, with the center portion of the foot resting on the footpeg. This proper stance is ergonomically correct and best for appropriate balance and weight distribution. Indeed, many boot manufacturers provide a replacement sole patch in the center area of the boot as that section of the boot is expected to wear out through constant contact with the footpeg.

However, current motorcycles are designed to fit an average-sized person, as determined by the manufacturer. Most manufacturers build motorcycles to fit a male of medium build, 150 to 160 pounds, with size 8-9 feet. In the case of the gearshift pedal assembly, there is an obvious problem with anyone with a foot size much larger or smaller than the average size: since stock gearshift pedal assemblies are not adjustable for length and are positioned at distance from the footpeg predetermined by the manufacturer, a rider with a larger or smaller than average foot may not be able to comfortably or safely operate the shifter from the proper balance position stance on the footpeg. Such riders must adjust their stance by moving one foot forward or back, relative to their other foot, compromising balance and safety.

The gearshift pedal assembly may be removed from the gearshift spindle, rotated clockwise or counter clockwise, and replaced it in a different position on the spindle thereby relocating the knob higher or lower than the original stock position. But while it is possible to vertically adjust the position of a stock shift lever in this manner, the adjustment is usually impractical since rotating the distance of just one tooth of adjustment on the spindle typically moves the knob about 10 mm, which is usually greater than desired. This is because the spindle is not specifically designed to be a point of adjustment, but is designed for easy removal and replacement of the lever assembly in the stock position.

It is therefore an object of this invention to provide a gearshift pedal level system that is adjustable in the horizontal and/or vertical directions.

SUMMARY OF THE INVENTION

The invention is directed to a replacement gearshift pedal lever for motorcycles that is adjustable in that it allows the user to modify the distance between the foot peg and the stock shift pedal lever and/or to adjust the height of the shift pedal lever. The replacement pedal lever may preferably be attached to the stock pedal arm by means of a screw assembly, although other means of attachment are possible. Alternatively, the user may replace the stock pedal arm with a pedal arm specifically adapted to receive the replacement gearshift pedal lever. It will be understood that in practice the pedal lever may be designed for cooperation with the pedal arm of a specific model of motorcycle, or, alternatively, an assembly including the pedal lever and a replacement pedal arm may be provided.

Replacement pedal levers may be constructed in a variety of offset lengths thus allowing the user to select a lever which creates the desired increase or decrease in the distance between the footpeg and the lever. Typically, most foot sizes may be accommodated with a choice of offsets between −5 mm and +15 mm, although more extreme sizes can be offered, e.g., −10 mm and +20 mm offsets. For levers with positive offset, that is, that increase the distance between the footpeg and the lever, it is advantageous to have an angled portion which allows the lever to avoid hitting the engine or other parts of the motorcycle and maintains an appropriate position between the lever and the footpeg.

The pedal lever may be attached to the pedal arm using two wing portions. The wing portions may be positioned with sufficient distance between them so as to allow the wing portions to fit over the cooperating portion of the pedal arm and allow one or more, and preferably two or more, washers or similar shim devices, to be placed between the interior of the wing portions and the pedal arm. By selectively positioning the washers above and/or below the pedal arm, the lever may be raised or lowered allowing for vertical adjustment of the pedal lever.

The use and advantages of the invention are more particularly described below.

DETAILED DESCRIPTION OF THE PREFERRED EMBODIMENT

Specifically, the invented system comprises a selectable replacement pedal lever 100, 200, 300 which may be attached to the stock gearshift pedal arm by means of a removable screw assembly.

Figure 1:
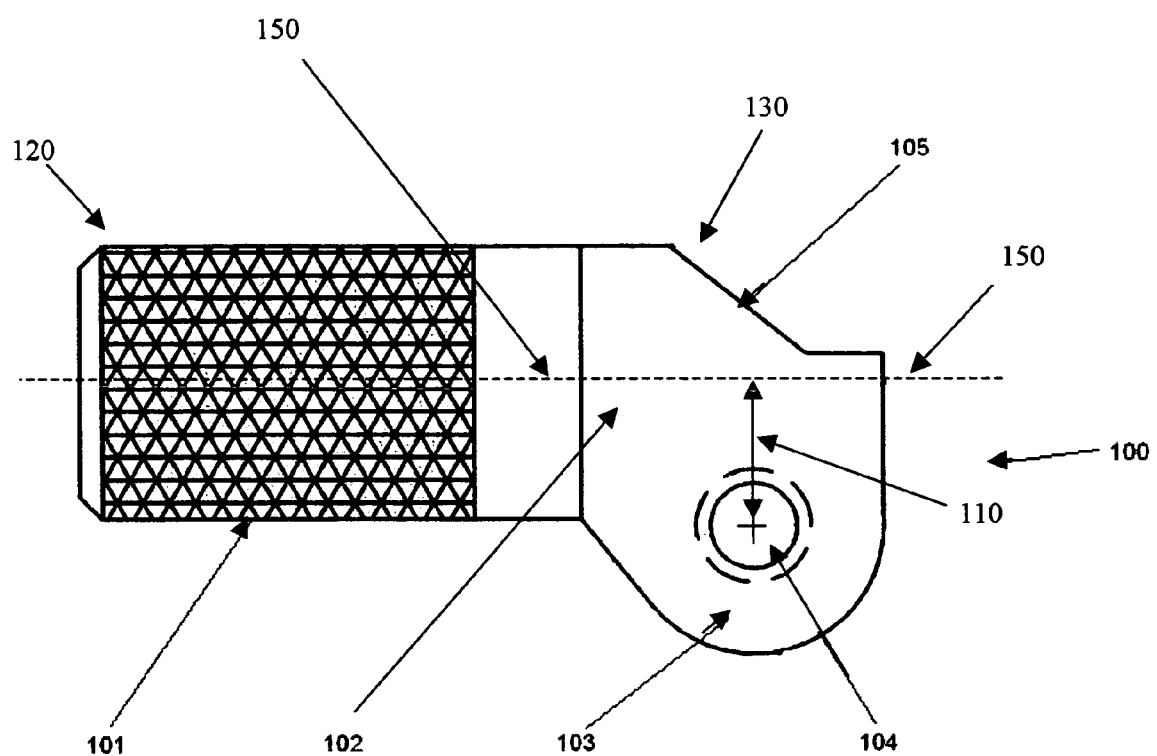
FIG. 1 shows a replacement pedal lever in accordance with the invention having a positive horizontal offset.
Figure 2:
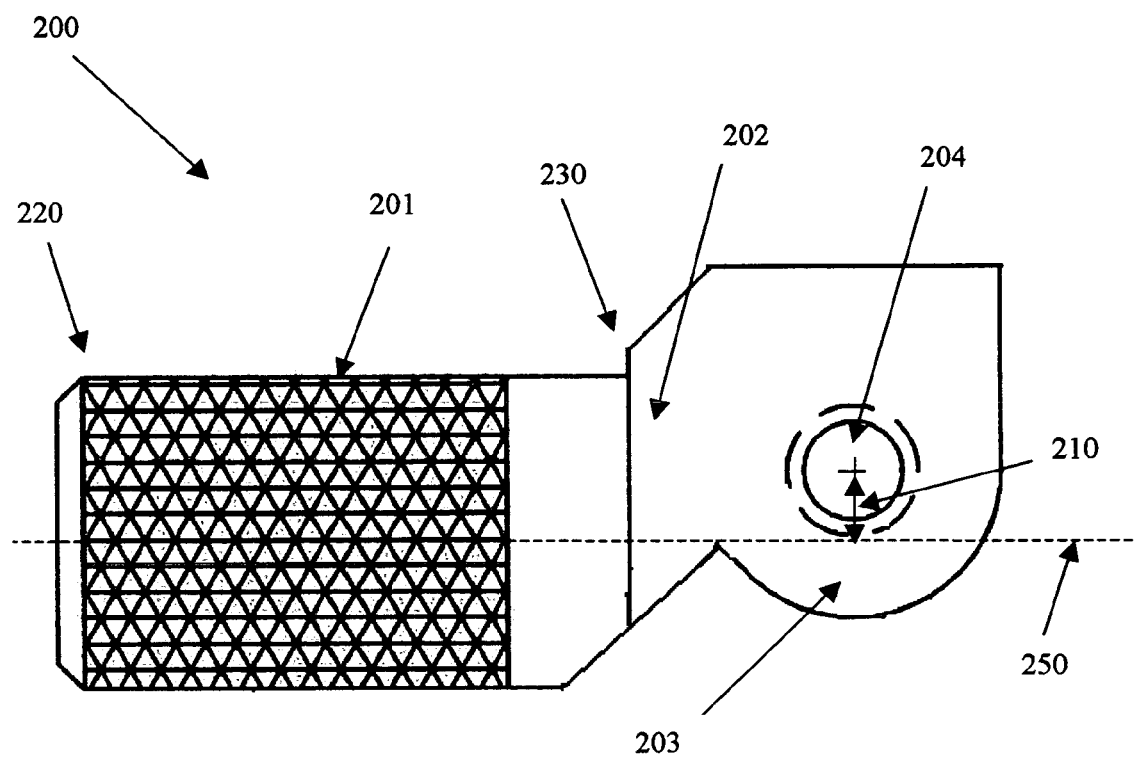
FIG. 2 shows a replacement pedal lever in accordance with the invention having a negative horizontal offset.
Figure 3:
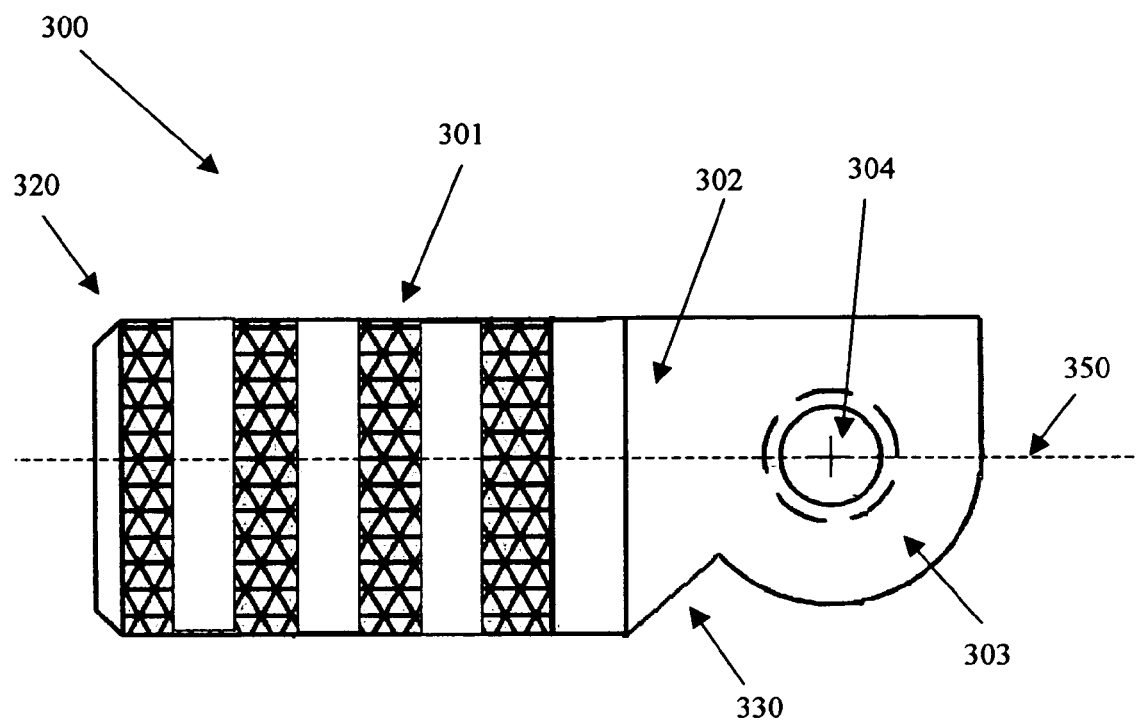
FIG. 3 shows a replacement pedal lever in accordance with the invention having no offset.

With reference to FIGS. 1-3, the user may select a replacement gearshift pedal lever 100, 200, 300 with one end 120, 220, 320 comprising a horizontal knob portion 101, 201, 301 that, when attached to the gearshift pedal arm by the removable screw assembly of a button screw 420 and shoulder screw 430, preferably extends at around a 90 degree angle relative to the motorcycle body and approximately parallel to the footpeg. The use of certain gearshift pedal levers 100, 200 results in an increase or decrease in the distance between the footpeg and the pedal lever 100, 200 relative to the distance between the footpeg and the stock pedal lever.

The pedal lever 100, 200, 300 further comprises a second end, 130, 230, 330 connected to an attachment section 102, 202, 302 that generally including two wing portions 103, 203, 303 that fit over the cooperating portion of the pedal arm and include holes 104, 204, 304. The holes 104, 204, 304 are adapted to accept a screw or other fastener assembly, which may include a button screw 410 and a shoulder screw 420, and are adapted to align with holes (not shown) formed in the cooperating portion of pedal arm.

The knob portion can be viewed as forming a central axis 150, 250, 350 that runs from the first end of the pedal lever to the second end of the pedal lever. As noted above, the knob portion of these selectable gearshift pedal levers 100, 200 when attached for use, have an increased or decreased distanced from the footpeg in comparison with as stock pedal lever. This may be effected by creating a positive horizontal offset 110 or negative horizontal offset 210 of the center of the fastening assembly, in these embodiments the center of the hole 104, 204, by a selected distance from the central axis 150, 250 of the knob portion 101, 201. A zero offset will usually result in a replacement pedal lever with the knob portion at essentially the same distance from the footpeg as the stock pedal lever knob. This is shown in FIG. 3, where the center of the hole 304 lies on the axis 350.

The replacement pedal levers 100, 200, 300 may be constructed in a variety of offset lengths. Typically, most foot sizes may be accommodated with a choice of −5 mm, +5 mm, +10 mm and +15 mm offsets, although more extreme sizes can be offered, e.g., −10 mm and +20 mm offsets. It will be understood by a person of ordinary skill in the art that the other offsets may be used. The offset of the center of the fastening assembly may or may not correspond with the exact change in the distance between the footpeg and the pedal lever depending on the shape of the device. Further, a pedal lever 300 with an offset of zero or an offset that results in a distance between the foopeg and the level essentially identical to that when the stock pedal lever is used, may also be offered, as the system further provides for height adjustability.

Because of the angle at which the gearshift pedal arm typically extends from the gearshift spindle, it is advantageous for a replacement pedal lever 100, especially a replacement lever with a positive offset, to include an angled portion 105 such that the position of the horizontal knob portion 101 relative to the motorcycle body and the footpeg is maintained. Additionally, the angled portion 105 allows the pedal lever to avoid hitting the engine or other portions of the motorcycle. It will be understood by persons of ordinary skill in the art that the exact angle of the angled portion 105 will vary depending on the offset selected and construction of the motorcycle.

Figure 4:
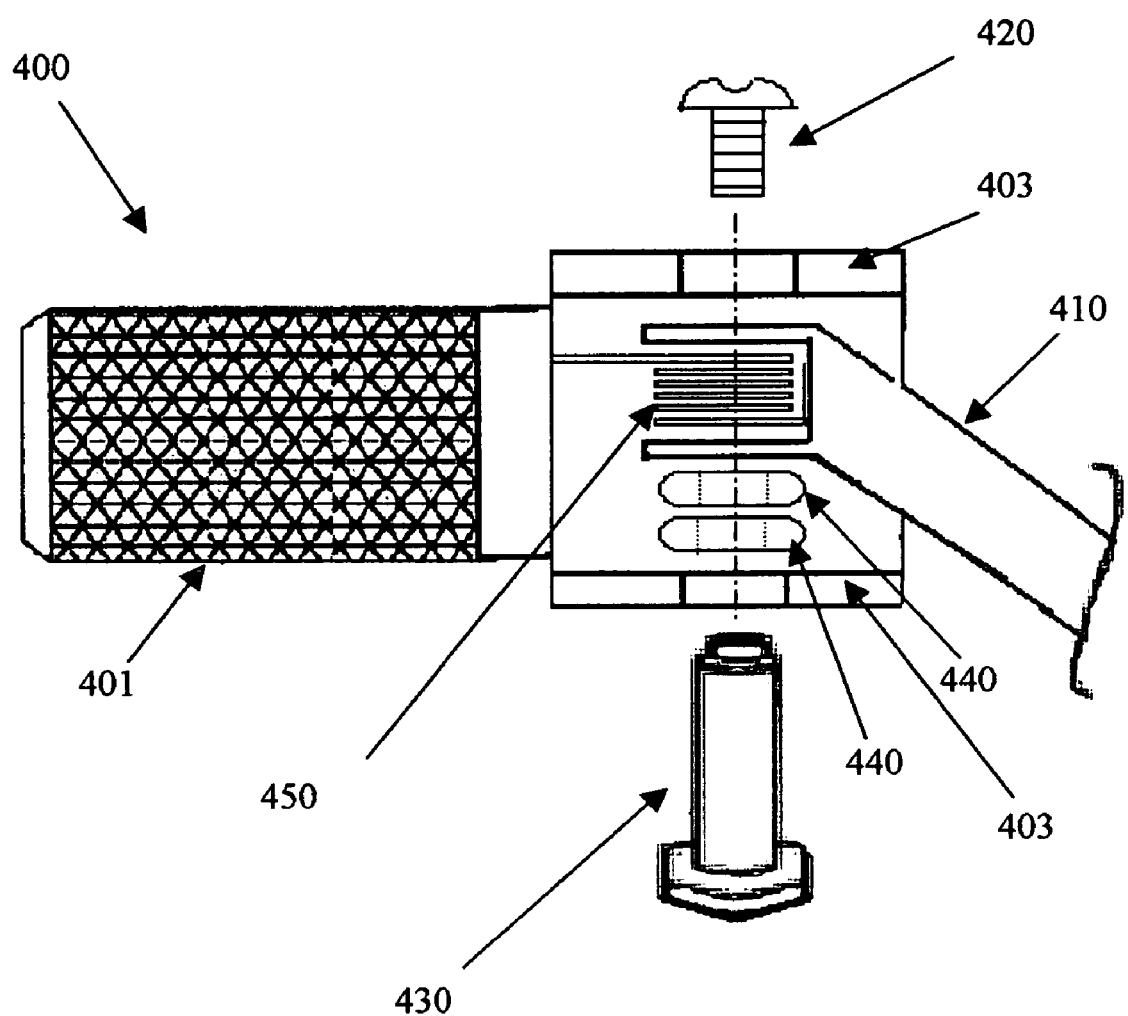
FIG. 4 shows the replacement pedal lever adjusted vertically downward.
Figure 5:
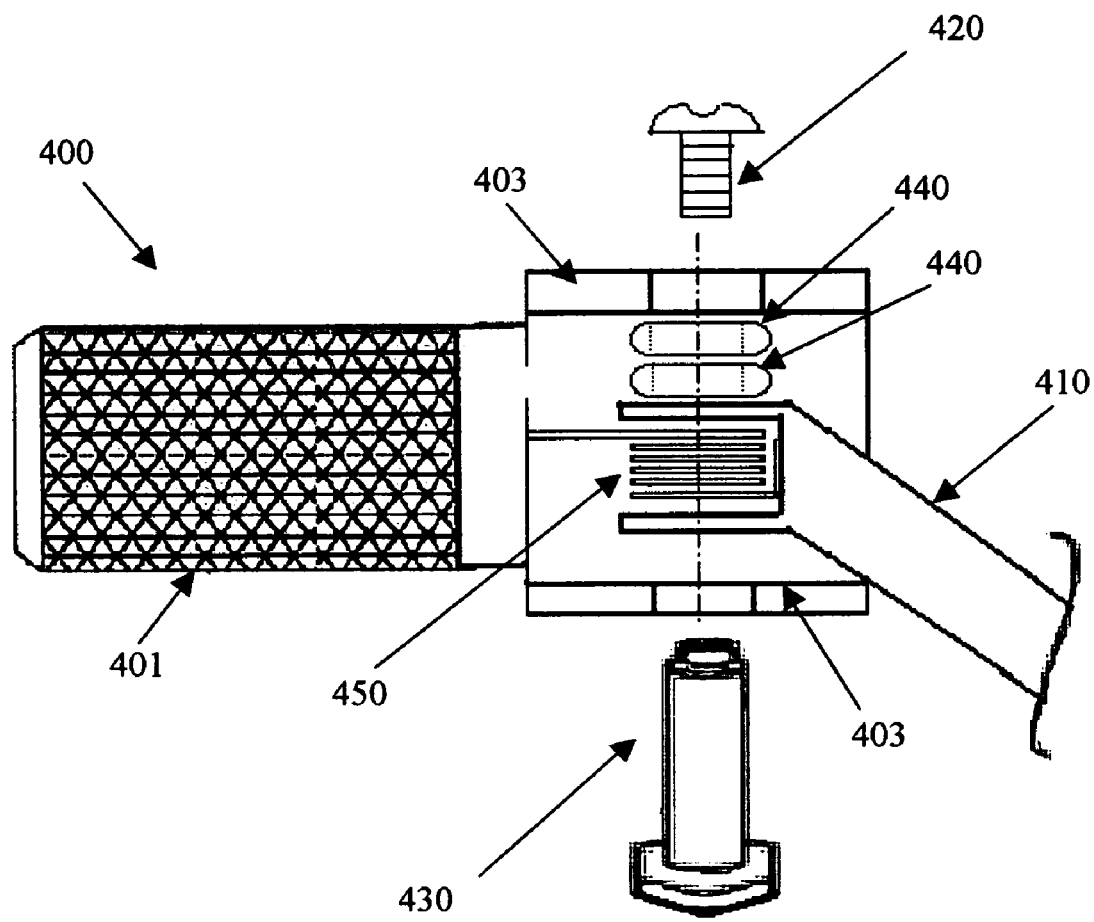
FIG. 5 shows the replacement pedal lever adjusted vertically upward.
Figure 6:
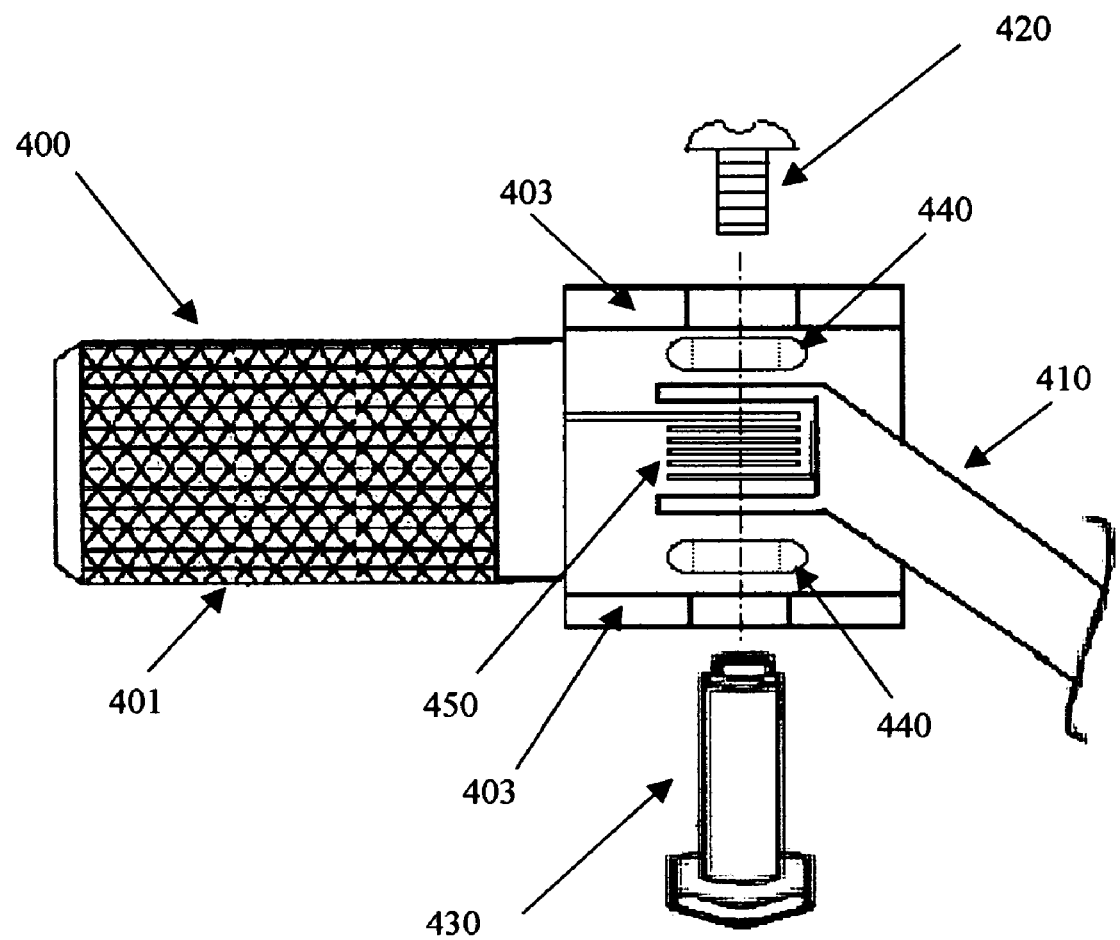
FIG. 6 shows the replacement pedal lever adjusted to a neutral vertical position.

With reference to FIGS. 4-6, the holes on the pedal arm will usually be designed to accept a rivet, as most manufacturers' stock pedal levers are attached using a rivet. To attach the pedal lever 400 (which may be any of pedal levers 100, 200, 300) to the pedal arm 410, the user removes the standard rivet (for example, by drilling) which typically connects the stock pedal lever to the pedal arm 410 and attaches the selected pedal lever 400 to the pedal arm 410 using the removable screw assembly of the button screw 420 and a shoulder screw 430. When replacing the rivet, the stock spring 450 may be retained and used in the device for the purpose of allowing some rotational flexibility and a return of the knob 401 to the proper position in the event of accidental impact; alternatively, a new spring could be provided for use with the device.

The screw assembly shown allows for both replacement of the pedal lever and slight vertical adjustment of the knob 401, through the use of moveable shims 440, such as washers. It has been found that even a slight vertical adjustment, on the order of a few millimeters, may have a significant effect on the comfort of the rider. It will be understood, however, that other types of fastener assemblies, including fasteners that are fixedly attached, in whole or in part, to the wing portions, may be used that would also allow for the use of the moveable shims described below.

The wing portions 403 are positioned with sufficient distance between them so as to allow the wing portions 403 to fit over the cooperating portion of the pedal arm 410 and allow one or more, preferably two or more, washers or similar shim devices 440, to be placed between the interior of the wing portions 403 and the pedal arm 410. The height of the pedal lever 400 may thereby be adjusted by selectively placing the washers or shims 440 above or below the pedal arm 410. If two shim devices 440 are used, placing both washers below the pedal arm, as shown in FIG. 4, will raise the pedal lever 400; placing both washers above the pedal arm, as shown in FIG. 5, will lower the pedal lever 400. Alternatively, one washer may be placed above and one washer below the pedal arm to maintain the stock horizontal position, as shown in FIG. 6. When using two washers, there are three position options. It will be appreciated that fewer or more washers can be used with an associated increase or decrease in the number of vertical positions possible. When using four washers, for example, there are five position options.

The pedal levers may be constructed of appropriate material known to persons of ordinary skill in the art, for example, appropriate grades of steel or aluminum. In one embodiment, billet aluminum has been used successfully. The pedal levers and other portions of the system may also be durably color coded through an annealing process to allow immediate identification of, for example, the manufacturer for which the replacement system is intended, the particular offset, or other pertinent information.

While the present invention has been shown and described with reference to the foregoing preferred embodiment, it will be apparent to those skilled in the art that changes in form, connection, and detail may be made therein without departing from the spirit and scope of the invention as defined in the appended claims:

What is claimed is:

1. An adjustable shift lever for motorcycles and the like, comprising:
   a shift tip comprising
      a first end comprising a knob portion; and
      a second end opposite the first end, and connected to the knob portion, wherein the second end is connected to two substantially parallel wing portions adapted to fit over a cooperating portion of a motorcycle shift arm;
   a fastener assembly for connecting to at least one of the wing portions and for securing the shift tip to the shift arm; and
   a shim adapted for placement between the cooperating portion of the motorcycle shift arm and at least one of the wing portions, and wherein the distance between the wing portions is approximately equal to the cooperating portion of the motorcycle shift arm plus the collective width of the at least one shim whereby the position of the shift tip may be selectively modified by the positioning of the at least one shim.

2. The shift lever of claim 1 wherein the shim is selectably placeable in one of at least two positions.

3. The shift lever of claim 1 further comprising at least two shims adapted for placement between the cooperating portion of the motorcycle shift arm and at least one of the wing portions.

4. The shift lever of claim 1 further comprising at least four shims adapted for placement between the cooperating portion of the motorcycle shift arm and at least one of the wing portions.

5. The shift lever of claim 1 wherein the knob portion defines a central axis running between the first end and the second end and each of the wing portions forms a hole adapted to accept the fastening assembly and wherein each hole defines a centerpoint, wherein each of the wing portions is connected to the second end by a slanting member, whereby the centerpoint of each of the holes are offset a selected distance in the same direction from the central axis.

6. The shift lever of claim 5 wherein the selected distance is at least 5 mm.

7. The shift lever of claim 5 wherein the selected distance is at least 10 mm.

8. The shift lever of claim 5 wherein the selected distance is at least 15 mm.

9. An adjustable shift lever for motorcycles and the like, comprising:
   a shift tip comprising
      a first end comprising a knob portion and
      a second end opposite the first end, wherein the second end is connected to two substantially parallel wing portions adapted to fit over a cooperating portion of a motorcycle shift arm and wherein the knob portion defines a central axis running between the first end and the second end; and
   a fastener assembly for connecting to at least one of the wing portions and for securing the shift tip to die shift arm wherein each of the wing portions is connected to the second end by slanting member such that the fastener assembly is offset a selected distance from the central axis.

10. The shift lever of claim 9 wherein the selected distance is at least 5 mm.

11. The shift lever of claim 9 wherein the selected distance is at least 10 mm.

12. The shift lever of claim 9 wherein the selected distance is at least 15 mm.

13. The shift lever of claim 9 wherein each of the wing portions forms a hole adapted to accept the fastening assembly; and wherein each hole defines a centerpoint; and wherein each centerpoint is offset the selected distance in the same direction from the central axis.

14. The shift lever of claim 9, further comprising a shim adapted for placement between the cooperating portion of the motorcycle shift arm and at least one of the wing portions and wherein the shim is selectably placeable in one of at least two positions, and wherein the distance between the wing portions is approximately equal to the cooperating portion of the motorcycle shift arm plus the collective width of the at least one shim, whereby the position of the shift tip may be selectively modified by the positioning of the at least one shim.

15. An adjustable shift lever for motorcycles and the like, comprising;
   a shift tip comprising
   a first end comprising a knob portion; and
   a second end opposite the first end, wherein the second end is connected to two substantially parallel wing portions adapted to fit over a cooperating portion of a motorcycle shift arm and wherein the distance between the wing portions is approximately equal to the cooperating portion of the motorcycle shift arm plus the collective width of the at least one shim, whereby the position of the shift tin may be selectively modified by the positioning of the at least one shim;
   a fastener assembly for connecting to at least one of the wing portions and for securing the shift tip to the shift arm; and
   a shim adapted for being selectively placed between the cooperating portion of the motorcycle shift arm and the wing portions in one of at least two positions; and
   wherein the knob portion defines a central axis between the first end and the second end, and wherein each of the wing portions is connected to the second end by a slanting member such that the fastener assembly is offset a selected distance from the central axis.

* * * * *